US006104468A

United States Patent [19]

Bryniarski et al.

[11] Patent Number: 6,104,468

[45] Date of Patent: Aug. 15, 2000

[54] IMAGE MOVEMENT IN A PHOTOGRAPHIC LABORATORY

[75] Inventors: Gregory R. Bryniarski; Brian R. Wilson, both of Rochester, N.Y.

[73] Assignee: Eastman Kodak Company, Rochester, N.Y.

[21] Appl. No.: 09/107,571

[22] Filed: Jun. 29, 1998

[51] Int. Cl.$^{7}$ .......................... G03B 27/00; G03B 27/32; G03B 27/52

[52] U.S. Cl. ................................ 355/18; 355/27; 355/40

[58] Field of Search ................................ 355/18, 27, 40, 355/77; 358/474, 475, 487; 395/610, 611; 396/312, 319

[56] References Cited

U.S. PATENT DOCUMENTS

| | | | |
|---|---|---|---|
| 5,157,482 | 10/1992 | Cosgrove | 358/54 |
| 5,218,455 | 6/1993 | Kristy | 358/403 |
| 5,223,891 | 6/1993 | Fierstein et al. | 355/77 |
| 5,281,993 | 1/1994 | Crochetierre et al. | 355/40 |
| 5,477,353 | 12/1995 | Yamasaki | 358/487 |
| 5,493,677 | 2/1996 | Balogh et al. | 395/600 |
| 5,502,532 | 3/1996 | Biesinger et al. | 354/298 |
| 5,559,721 | 9/1996 | Ishii | 364/514 A |
| 5,590,321 | 12/1996 | Lin et al. | 395/610 |
| 5,602,974 | 2/1997 | Shaw et al. | 395/114 |
| 5,608,542 | 3/1997 | Krahe et al. | 358/449 |
| 5,617,119 | 4/1997 | Briggs et al. | 345/611 |
| 5,630,092 | 5/1997 | Carreiro et al. | 395/438 |
| 5,644,766 | 7/1997 | Coy et al. | 395/620 |
| 5,666,490 | 9/1997 | Gillings et al. | 395/200.68 |
| 5,721,911 | 2/1998 | Ha et al. | 395/611 |
| 5,760,876 | 6/1998 | Farling et al. | 355/40 |
| 5,774,752 | 6/1998 | Patton et al. | 396/312 |
| 5,799,219 | 8/1998 | Moghadam et al. | 396/319 |

FOREIGN PATENT DOCUMENTS

| | | |
|---|---|---|
| 0 679 909 A1 | 11/1995 | European Pat. Off. . |
| 9-015827 | 1/1997 | Japan . |
| 10 161248 | 6/1998 | Japan . |

*Primary Examiner*—Russell Adams
*Assistant Examiner*—Hung Henry Nguyen
*Attorney, Agent, or Firm*—Gordon M. Stewart; David A. Novais

[57] ABSTRACT

A method of routing images in the form of image signals, in a photofinishing laboratory between a first device which provides the images, a workflow controller, and at least one image processor. Identifications of the images are communicated to the workflow controller. Image processing requests and associated image identifications are communicated from the workflow controller to the image processor. Images from the first device are retrieved at the image processor by: (i) communicating image identifications from the image processor to the first device; and (ii) in response to the identifiers received from the image processor, communicating the images corresponding to the received identifiers from the first device to the image processor without using the workflow controller as an intermediary. A photofinishing laboratory which can execute such methods is also provided.

19 Claims, 3 Drawing Sheets

IMAGE MOVEMENT IN A PHOTOGRAPHIC LABORATORY

FIELD OF THE INVENTION

This invention relates to images, and in particular to the printing or other output of images in a photographic laboratory.

BACKGROUND OF THE INVENTION

In conventional photofinishing laboratories a user (sometimes referenced as a customer), delivers one or more film rolls carrying corresponding exposed films, to a processing laboratory to have them chemically developed and hardcopies of the images (such as paper prints or slides) prepared. The user can include an individual or a retail store. Individual films are often spliced together end to end to form a larger roll which is easily handled by automated equipment. Following chemical processing of the roll to yield permanent images from the latent images on the films, each image is scanned at high speed to obtain image characteristics, such as color and density. These characteristics are passed to an optical printer which uses the characteristic data to adjust exposure conditions (such as exposure time, color balance, and the like) of an image frame on the developed film which is optically projected onto a photosensitive paper. The exposed photosensitive paper is then chemically developed to yield the final hardcopy prints. When the customer order is completed, each film is cut into strips (for 35 mm film) or reattached to a film cassette (for Advanced Photo System films), the exposed paper (when prints are made) is cut into individual prints, and the film, completed prints and any other media (such as a disk bearing scanned images, or mounted slides) are packaged at a finishing station and the order is then complete.

In modern photofinishing laboratory, images may optionally also be scanned to provide an image signal corresponding to each image on the film. These image signals are usually stored on a medium such as a magnetic or optical disk and provided to the customer, or made available to the customer over a network such as the Internet, and may be used then or at a later time to provide a hardcopy output. Recently it has been described that in the foregoing type of photofinishing operation, the optical printer can be replaced with a digital printer which will print the images directly from the scanned data, following enhancements or other manipulations to the scanned images.

Photofinishing laboratories using scanners and digital printers provide more versatility in correcting or enhancing (either automatically or in accordance with customer requests) customer images, and providing multiple forms of outputs. The corrections or enhancements can be done in accordance with appropriate algorithms operating in one or more image processors. However, for such digital photofinishing laboratories to produce outputs which are comparable to conventional optical prints can require resolutions of at about 2000 by 2000 pixels or more. Thus, each uncompressed consumer image can readily result in a file of about 12 or more megabytes in size. In photofinishing laboratories, images can readily be scanned from customer orders at a rate of 200 images per minute or greater. This means that the laboratory must be able to route image data rates from scanners to image processors and to printers, in the multiple gigabyte or higher per minute rate. One approach to handling such image data, is merely to queue image data in front of a digital processor which receives the images one by one and allocates them to the next available image processor for digital corrections and/or enhancements. A disadvantage of such a configuration is that the images must be communicated to the allocating digital processor which must next pass the images at the high image data rates to the image processors. This sequence of multiply transferring the same images requires an allocation processor with high data transfer rates and slows the ability of the allocation device to determine which output device is available for the next image in its queue. Furthermore, since multiple image processors typically share the same communication network with the allocation processor and the scanner, multiple image transfers will generally slow communication rates on the network. These problems can be exacerbated when customers request multiple complex different image products from one or more images in an order, such as images on T-shirts, cups, calendars, or similar items or other image outputs, such as upload of digital image signals to the Internet, or an optical or magnetic disk carrying the images signals. Since different image processing may be required for such different image products, these additional requests can require even further image transfers on the network.

It would be desirable then, to provide in a photofinishing laboratory, a means by which image data transfers can be kept low so as to maintain high image data transfer rates when required. It would further be desirable that a means can be provided where images can be allocated and transferred to one or more image processors from the capturing device or storage device, without requiring an allocating processor which must receive and communicate the high volume image data itself.

SUMMARY OF THE INVENTION

The present invention then, provides a method of routing images in the form of image signals, in a photofinishing laboratory between a first device which provides the images, a workflow controller, and at least one image processor. The method comprises communicating identifications of the images to the workflow controller. Image processing requests and associated image identifications are communicated from the workflow controller to the image processor. The images from the first device are retrieved at the image processor by: communicating image identifications from the image processor to the first device; and in response to the identifiers received from the image processor communicating the images corresponding to the received identifiers from the first device to the image processor without using the workflow controller as an intermediary.

In a method of the present invention, it is possible for any one or more of the image processors to retrieve images from the first device at any time. For example, an image processor may retrieve images into a queue established in a memory directly accessible by that image processor, until the memory is full. Alternatively, the image processor may retrieve each of the images from the first device when the image processor is available to execute the corresponding image processing request.

In another aspect of the present invention, there is provided a method of generating image outputs in a photofinishing laboratory having a first device which provides the images in the form of image signals, a workflow controller, at least one image processor, and at least one output device. In this aspect, the method comprises communicating identifications of the images to the output system. These identifications may, for example, be communicated from the workflow controller to the output system. Processed images are requested at the output system from the workflow controller using the received identifications. Image processing requests and corresponding image identifications are communicated from the workflow controller to the image processor. Images are retrieved at the image processor from the first device by: (i) communicating image identifications from the image processor to the first device; and (ii) in response to the image identifications received from the image processor, communicating the images corresponding to the received identifications from the first device to the image processor without using the workflow controller as an intermediary.

In a particular aspect of the method of the present invention, the first device provides the images in the form of image signals associated with respective first identifiers. Second identifiers of the images, which correspond to respective first identifiers are communicated to the output system. The second identifiers may be generated by the workflow controller, for example. In such a case, the output system requests processed images from the workflow controller using the received second identifiers. The image processing requests and associated second identifiers are communicated from the workflow controller to the image processor. Images are retrieved at the image processor from the first device by: determining the first identifiers from the corresponding second identifiers; communicating the determined first identifiers from the image processor to the first device; and in response to the first identifiers received from the image processor, communicating the images corresponding to the received first identifiers from the first device to the image processor.

Any of the methods of the present invention may further optionally include scanning the developed physical images to obtain the corresponding images in the form of image signals, and storing the images in a first memory (which acts as a first device). Furthermore, the method may additionally comprise machine reading a code associated with the film to generate a corresponding read code signal. The image processing requests which are communicated from the workflow controller to the image processor may be a function of the read code signal (that is, such image processing requests may be determined in whole or in part by the read code signal).

The present invention further provides a photofinishing laboratory which, in various aspects, can execute any of the methods of the present invention. In one aspect the photofinishing laboratory comprises a first device which provides images in the form of image signals, and at least one image processor. A workflow controller is configured to receive identifications of the images and communicate image processing requests and associated image identifications, to the image processor. In such a laboratory the image processor and first device co-operate to allow the image processor to retrieve images from the first device, including: (i) the image processor communicating image identifications to the first device; and (ii) the first device, in response to the identifiers received from the image processor, communicating the images corresponding to the received identifiers to the image processor without using the workflow controller as an intermediary.

Another aspect of the photofinishing additionally includes at least one output device. In this aspect the workflow controller receives identifications of the images and communicates identifications of the images to the output device. The image processor, first device, workflow controller and output device co-operate to provide processed images to the output device including: (i) the output device requesting processed images from the workflow controller using the received identifications; (ii) the workflow controller communicating image processing requests and associated image identifications, to the image processor; (iii) the image processor communicating image identifications to the first device; and (iv) the first device, in response to the identifiers received from the image processor, communicating the images corresponding to the received identifiers to the image processor without using the workflow controller as an intermediary.

The photofinishing laboratory may include a chemical developer to chemically develop the film to yield developed physical images from the latent images, and a scanner to scan the developed physical images to obtain corresponding images in the form of image signals.

In any method or apparatus of the present invention, there may be one or more of any or all of the first device, the image processor, and the output device, each of which functions as described above. There could also be more than one workflow controller.

BRIEF DESCRIPTION OF THE DRAWINGS

Embodiments of the invention will now be described with reference to the drawings, in which.

Where practical, the same reference numbers have been used throughout the figures to indicate like parts.

DETAILED DESCRIPTION OF THE INVENTION

In the present application, it will be understood that a photographic laboratory includes a wholesale or retail photofinishing environment where many images from multiple customers are processed at a cost to the customers. While most photofinishing laboratories will include a chemical developer in which latent images are developed, such is not essential in order to have a photographic laboratory. For example, it may be that the many images from the different customers are provided to the laboratory as digital images (for example, from digital cameras, on optical or magnetic disks, or from uploads from a remote terminal through a network such as the Internet).

Figure 1:
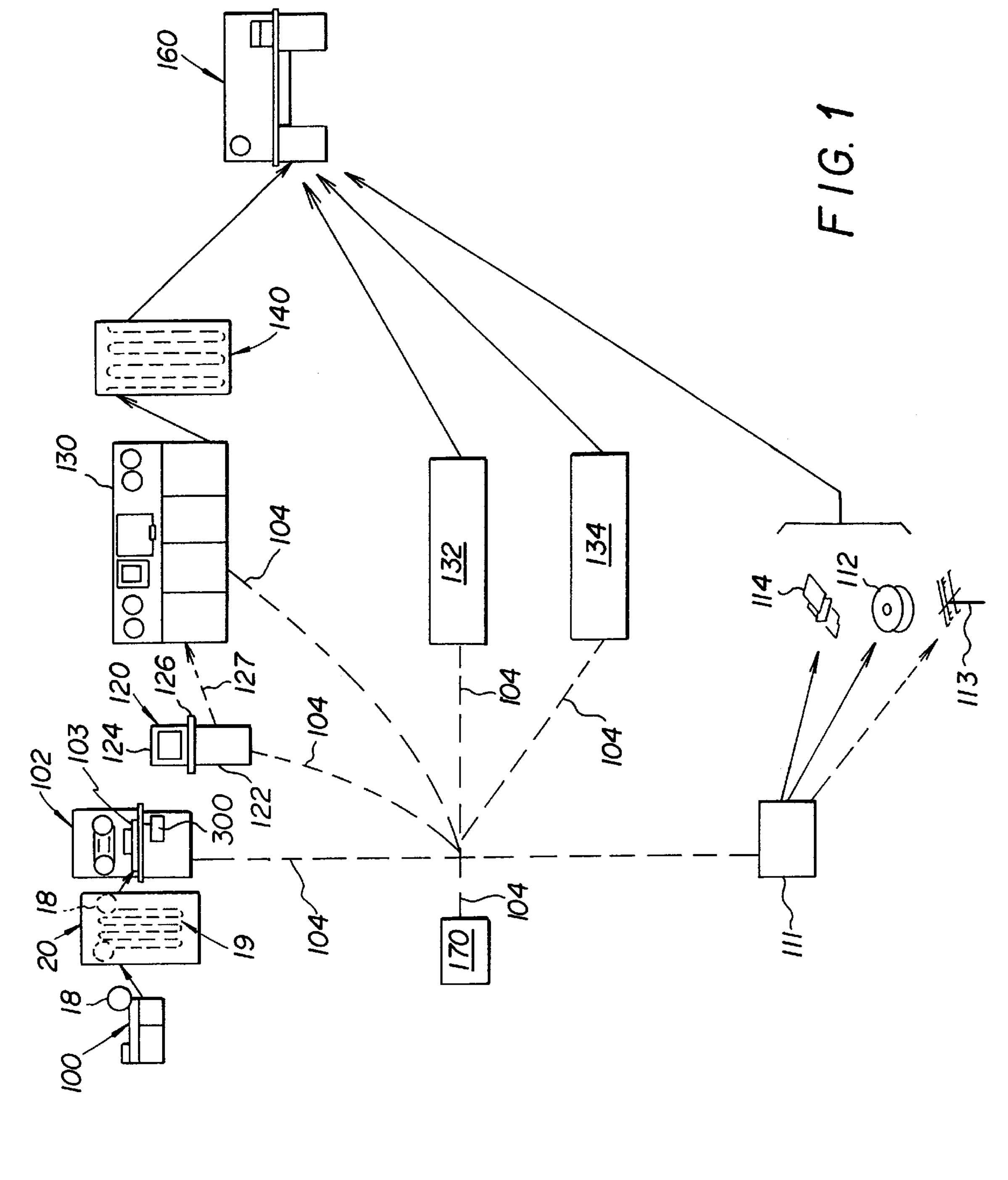
FIG. 1 is a schematic illustrating an apparatus of the present invention.
Figure 2:
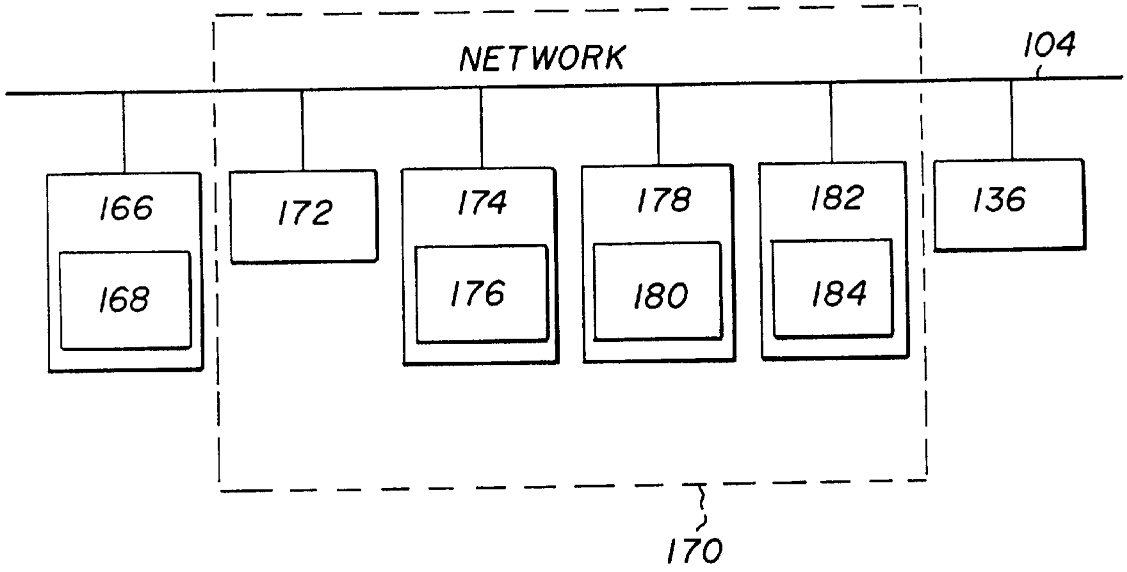
FIG. 2 illustrates some of the components of the apparatus of FIG. 1 in more detail.

Turning to FIGS. 1 and 2, the photographic processing apparatus of the present invention shown will now be described. For simplicity, FIG. 2 indicates any one of the image providing systems such as a scanner 102, or any of the input components of a media station 111 as a generic image providing device 166 (which includes a generic storage 168 representing storage devices 176, 180, or 184). Similarly, any one of the printers 130, 132, 134 or other image output devices described below is indicated generically as an output device 136 in FIG. 2. It will be understood though, that all of the image providing devices and output devices are connected to a common network, as illustrated in FIG. 1.

The apparatus of FIGS. 1 and 2 includes a known type of splicer 100. Splicer 100 splices exposed light sensitive filmstrips which have been removed from their respective light tight cassettes, together in a series by attaching them end to end. Each filmstrip is normally regarded as a single customer order (although it is possible for a single customer order to include more than one filmstrip), and carries a plurality of exposed latent images. The resulting attached series of filmstrips is referenced as a film which is placed on a reel 18. The film on reel 18 is then chemically developed through a series of steps in a chemical developer 20, in a known manner, to yield permanent visible physical images. Each filmstrip will typically be a negative type filmstrip yielding negative type images on a transparent base after developing by chemical developer 20, although the film-strips and developer 20 could be of a kind which produce positive transparencies (that is, slides) also in a known manner.

A developed film 19 exiting developer 20 is then passed to a high speed scanner 102 which operates at 200 images/minute or greater. Scanner 102 includes a film gate at which each image of the film can be successively positioned to receive light from a light source, which then passes through each image and a subsequent lens system to fall upon an image sensor. The image sensor can be a line sensor or area array sensor. Appropriate electronics (including an analog to digital converter) in the scanner 102 convert the sensor signals to digital signals. The output of scanner 102 then, is a series of digital image signals corresponding to each image on the film. Scanner 102 acts as a first capture device which provides the images in the form of digital image signals. Scanner 102 should be capable of scanning images with a reasonably high resolution, such as at least 400×200 pixels over the area of images (such as at least 600×400 pixels) and preferably at least 1000×1500 pixels (and most preferably at least 2000×3000 pixels). Scanners of the foregoing type are well known in the art and need not be described further. Scanner 102 includes intermediate storage 300 for the digital images, in the form of magnetic disk drives or any other suitable read/write storage device.

Scanner 102 is also fitter with a film code reader 103, which may either be an optical or a magnetic code reader capable of reading optical or magnetic codes on a film. Such codes may, for example, be provided by a customer to indicate specific types of image processing he would like to have performed on all of the images or specific ones of the images (as indicated by the code) of his order. For example, such codes could indicate that the customer wants a panoramic print of a particular part of a specified image, or wants a particular image product incorporating the specified image (for example, or T-shirt or cup), or wants specified color modifications to a particular image (for example, indicating an order for a black and white print from a specified image), or could indicate that the customer wants a particular type of image output (for example, a portable optical or magnetic disk) with specified images at one or more indicated resolutions.

Image signals are passed over communication network connection 104 from scanner 102 to an Image Data Manager ("IDM") 170. IDM 170 includes a workflow controller 172 and three image processors 174, 178, 182 all interconnected over the same network 104. Workflow controller 172 and each of image processors 174, 176, 182 are separate physical devices. Each one of the image processors 174, 178, 182 may, for example, be one or more general purpose digital microprocessors operating in parallel and suitably programmed to execute the functions required by each, or may be equivalent hard wired circuits in whole or in part. Similarly, workflow controller 172 may be a suitably programmed digital microprocessor or equivalent hard wired circuits in whole or in part. Image processors 174, 178, 182 may be programmed to execute the same or different image processing instructions, such as image enhancement or correction, and/or formatting for any particular output device. Each image processor 174, 178, 182 also includes a read/write memory 176, 180, 184, respectively, in the form of a magnetic disk drive. IDM 170 is also connected through network 104 with an image preview station 120 and a number of output devices in the form of a printers 130, 132, 134. IDM 170 is further connected through network 104 to other output devices in the form of a media station 111, which provides image signal outputs on magnetic disks 114, optical disks 112, or over a communication channel 113 (which may be wire, fiber optic cable, or wireless) to the Internet.

Image preview station 120 includes a processor 122 and a connected monitor 124 (sometimes referenced as a screen) and operator input device 126 in the form of a keyboard and/or mouse or other suitable operator input device. Processor 122 is optional in the sense that functions performed by it can be performed by IDM170. Monitor 124 may, for example, be a CRT or LCD screen. Preview station 120 provides its output, back to IDM 170 through network 104 although it could also provide its output to printer 130 through a second network 127. Each of printers 130, 132, 134 may, for example, be a high speed color laser printer which prints digital image signals received from IDM 170 (or from preview station 120) on a light sensitive photographic paper web. Alternatively, any or all of the printers 130, 132, 134 could be inkjet, thermal or any other suitable image printer. Exposed photographic paper from printer 130 is then developed in color paper developer 140 to yield fixed images on the paper, in a known manner. The web, following developing in developer 140 is transported to a finishing station 160 to which the scanned film on reel 18 is also sent. Similarly a web or individual printed sheets from printers 132, 134 are also transported to finishing station 160. At finishing station 160 any paper webs are cut into individual image prints, each scanned filmstrip is cut into strips (for 35 mm film) or reinserted into a cassettes (for Advanced Photo System film), and any prints from printers 130, 132, 134 are mated with the corresponding customer film and any optical or magnetic disks 112, 114 to complete the customer's order.

It will be appreciated that in the present invention, image signals may be obtained from additional or other devices which provide the images. For example, image signals might be provided to IDM 170 by being read from floppy magnetic disks 114, optical disks 112 or received from the Internet over communication channel 113. Such image signals can be handled by IDM 170 and preview station 120 in the same manner as image signals received from scanned photographic media. It will be appreciated in this case that media station 111 is a media input and output station capable of both reading and writing to disks 112, 114 and transmitting or receiving over communication channel 113.

In operation of the laboratory apparatus of FIGS. 1 and 2, it will first be assumed that a film on reel 18 has already been positioned for scanning on scanner 102. Next then, film 19 is scanned on scanner 102. Physical images of a filmstrip 12 in an order (again, one filmstrip 12 typically being one order) are continuously scanned one after the other in the sequence in which they occur on the filmstrip 12, to produce corresponding digital image signals. All of the filmstrips on reel 18 are continuously scanned one after the other in the order in which they are attached together in film. The digital image signals (which may simply be referenced as "images") are stored in storage 300.

Figure 3:
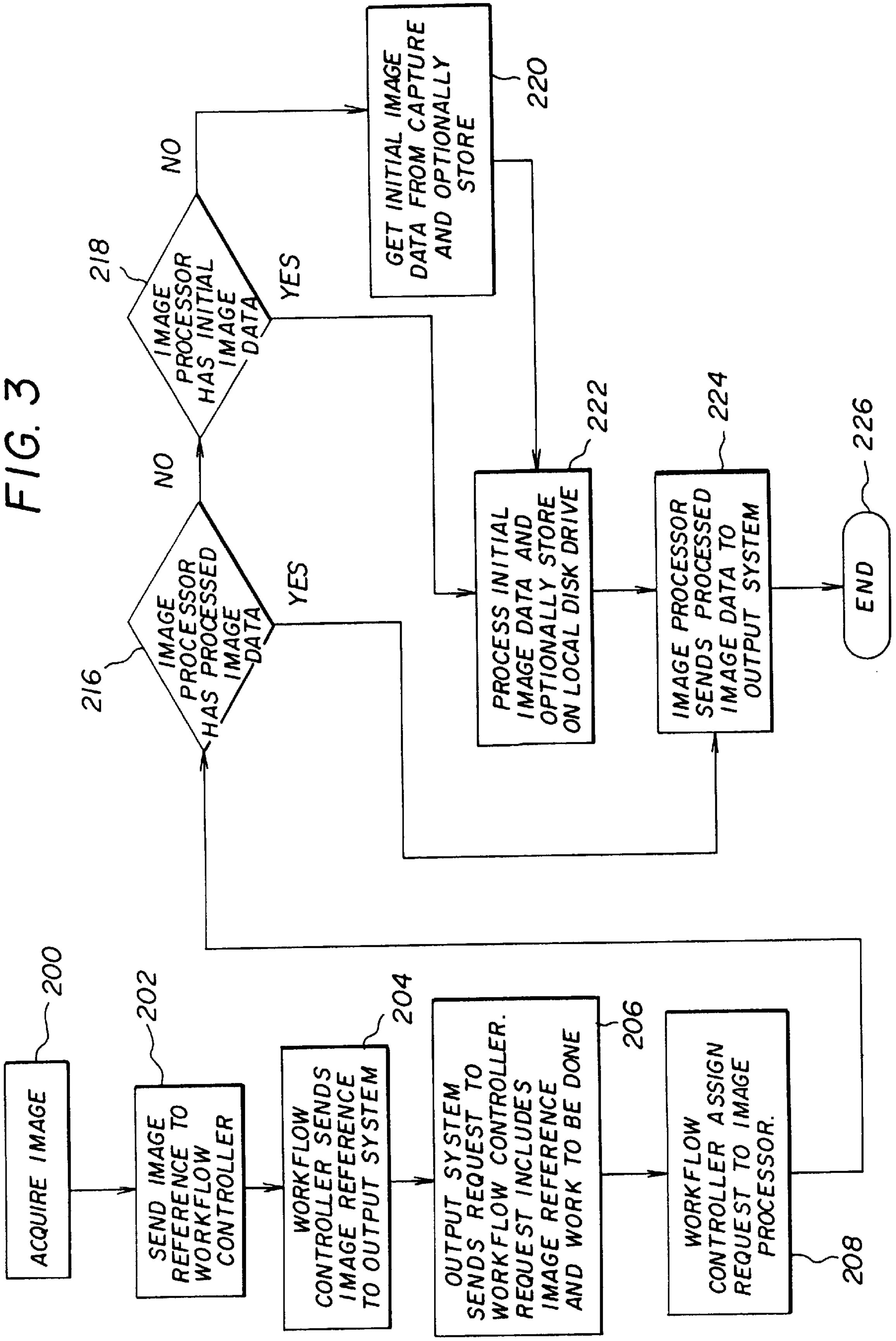
FIG. 3 is a flowchart illustrating a method of the present invention.

Referring in particular to FIG. 3 and the details of the photographic laboratory apparatus as shown in FIG. 2, a method of the present invention as executed by the apparatus of FIGS. 1 and 2 will now be described. As already mentioned, more than one image providing device 166 and image output device 132 are present as indicated in FIG. 1. However, for simplicity the method will be described with reference to only one image providing device and output device, it being understood that operation with regard to the other image providing and output devices is similar. In particular, image providing system 166 acquires (200) initial image and meta data. The meta data is data which includes an identification of each associated image, such as a filename assigned in the image providing system 166, and may also include other data regarding image parameters such as read code data from film code reader 103. Initial image data is stored in storage device 168. A first identification associated with a given image will be referenced as an image meta data value "V1" for an associated stored image. Image providing system 166 communicates (202) the image data for each image, and its associated identification V1, to Workflow Controller 172 over network 104. Workflow controller 172 generates a second image identification V2 corresponding to the identification V1 for an associated image. The identification V2 is associated with the image identification V1 which is in turn associated with the corresponding image. The Workflow Controller 172 communicates (204) the image identification V2 to the output device 136 over network 104. Output system 104 requests (206) processed image data using the image identification V2. This request is sent to the workflow controller 172 over network 104. The request can include an indication of the image processing output system or device requirements, either expressly or implicitly (for example, by identifying the particular output system as one requiring an image in a specific format).

Workflow controller 172 assigns (208) the request to an image processor 174, 178, or 182 over network 104. The assignment may be based on availability. For example, an image processor 174, 178, 182 may retrieve an image as the image processor is available to process another image. Where each of the image processors preferentially executes a particular type of processing (for example for a specific output device), the assignment may be based on the image output requested by the customer (for example through the read film code) or required by a particular output device. The image processor 174, 178, or 182 which receives the assignment uses the image identification V2 to determine (216) if the required processed image data already exists in the requested state on its storage 176, 180, or 184. If it does, that image processor communicates (224) the processed image data to the output device which requested it, and the method for that image is complete (226). The required processed image data may already exist on the image processor by, for example, the workflow communicator having previously sent that image in association with the second identification V2 to that processor. This previous sending can be done when workflow controller 172 determines that there is unused capacity on the network 104 without waiting for a request from an output device. Furthermore, an image processor receiving such an image may then process it when it has free capacity, without waiting for the request for an output device.

If at step (216) the required processed image data is found not to exist on a storage of an image processor 176, 180, or 184, the image processor uses the second identification V2 to determine if the initial data for the associated image (that is, the unprocessed image data) is contained on its storage. If so then the image processor processes (222) the initial image data and optionally stores this processed image data in its storage 176, 180, or 184. The processed image is then communicated (224) to the requesting output device and the method is complete (226) for that one image. If the initial image data for the associated image is found in step (218) not to be present on the storage of the image processor, then the image processor uses the second identification to determine the first identification V1. This can be readily accomplished when the algorithm for assigning V2 at the workflow controller 172 is known by the image processor. For example, V2 may simply be the filename of an associated image as stored in storage 168, together with a network device identification of storage 168 on network 104. The image processor then uses V1 to retrieve (220) the associated image from storage 168 of the image providing device 166, over network 104. The image providing device 166 uses the first identification V1 received from the image processor to locate the requested initial image data on its storage 168 and forward it over network 104 to the requesting image processor. The requesting image processor 174, 178, or 182 then processes (222) the retrieved image data to generate the processed image data. The processed image data is then transferred over network 104 to the output system that made the original request. At this point, the method for a single image is complete (226).

The invention has been described in detail with particular reference to certain preferred embodiments thereof, but it will be understood that variations and modifications can be effected within the spirit and scope of the invention.

PARTS LIST

| | |
|---|---|
| Reel | 18 |
| developed film | 19 |
| chemical developer | 20 |
| splicer | 100 |
| scanner | 102 |
| film code reader | 103 |
| network | 104 |
| media station | 111 |
| optical disks | 112 |
| communication channel | 113 |
| magnetic disks | 114 |
| image preview station | 120 |
| processor | 122 |
| monitor | 124 |
| operator input device | 126 |
| second network | 127 |
| printers | 130, 132, 134 |
| output device | 136 |
| developer | 140 |
| finishing station | 160 |
| image providing device | 166 |
| storage | 168 |
| Image Data Manager ("IDM") | 170 |
| workflow controller | 172 |
| image processors | 174, 178, 182 |
| storage devices | 176, 180, 184 |

What is claimed is:

1. A method of routing images as image signals between an image device which provides the images, a workflow controller, and at least one image processor, the method comprising the steps of:

(a) communicating image identifications as image data associated with the image signals and image processing requests associated with the images to the workflow controller;

(b) communicating the image processing requests and the associated image identifications from the workflow controller to the image processor; and (c) retrieving at the image processor, the images from the image device by:

communicating the image identifications from the image processor to the image device; and in response to the image identifications received from the image processor, communicating the images corresponding to the received image identifications from the image device to the image processor while bypassing the workflow controller as an intermediary.

2. A method according to claim 1 wherein the image processor retrieves each of the images from the image device when the image processor is available to execute the image processing request.

3. A method according to claim 1 wherein there are a plurality of image processors each of which receives image processing requests and associated image identifications from the workflow controller, and each of which retrieves images from the image device using the received image identifications.

4. A method of generating image outputs in a photofinishing laboratory having an image device which provides images as image signals, a workflow controller, at least one image processor, and at least one output system, the method comprising the steps of:

(a) communicating image identifications as image date associated with the images to the output system;

(b) at the output system requesting processed images from the workflow controller using the image identifications;

(c) communicating image processing requests associated with the images and corresponding image identifications from the workflow controller to the image processor; and (d) retrieving at the image processor, the images from the image device by:

communicating the image identifications from the image processor to the image device; and in response to the image identifications received from the image processor, communicating the images corresponding to the image identifications from the image device to the image processor without using the workflow controller as an intermediary.

5. A method according to claim 4 wherein in step (a), the image identifications of the images are communicated from the workflow controller to the output system.

6. A method according to claim 4 additionally comprising, at the image processor, processing each of the retrieved images in accordance with the corresponding image processing request.

7. A method according to claim 6 additionally comprising communicating the processed images to the output system.

8. A method according to claim 4 wherein the output system is a printer.

9. A method of generating image outputs in a photofinishing laboratory having an image device which provides images as image signals in association with respective first image identifiers, a workflow controller, at least one image processor, and at least one output system, the method comprising the steps of:

(a) communicating second image identifiers of the images, corresponding to respective first image identifiers, to the output system;

(b) at the output system, requesting processed images from the workflow controller using the received second image identifiers;

(c) communicating image processing requests associated with the images and associated second image identifiers from the workflow controller to the image processor; and (d) retrieving at the image processor, the images from the image device by:

determining the first image identifiers from the corresponding second image identifiers;

communicating the determined first image identifiers from the image processor to the image device; and in response to the first image identifiers received from the image processor, communicating the images corresponding to the received first image identifiers from the image device to the image processor.

10. A photofinishing method for processing latent images on a film, the method comprising the steps of:

(a) chemically developing the film to yield developed physical images from the latent images;

(b) scanning the developed physical images at an image obtaining device to obtain corresponding images as image signals;

(c) storing the image signals in a memory;

(d) communicating image identifications of the stored image signals to a workflow controller;

(e) communicating image processing requests associated with the images and associated image identifications from the workflow controller to at least one image processor;

(f) retrieving at the image processor, the stored image signals from the memory by:

communicating the image identifications from the image processor to the image obtaining device; in response to the image identifications received from the image processor communicating the images corresponding to the received image identifications from the image obtaining device to the image processor without using the workflow controller as an intermediary; and (g) processing the images at the image processor in accordance with the image processing requests.

11. A method according to claim 10 additionally comprising machine reading a code associated with the film to generate a read code signal, and wherein the image processing requests communicated from the workflow controller to the image processor are a function of the read code signal.

12. A photofinishing laboratory, comprising:

(a) an image device which provides images as image signals;

(b) at least one image processor; and (c) a workflow controller which receives image identifications of the images and which communicates image processing requests associated with the images and associated image identifications, to the image processor;

wherein the image processor and the image device co-operate to allow the image processor to retrieve images from the image device, including:

the image processor communicating the image identifications to the image device;

the image device, in response to the image identifications received from the image processor, communicating the images corresponding to the image identifications to the image processor without using the workflow controller as an intermediary; and there are a plurality of said image processors each of which receives the image processing requests and associated image identifications from the workflow controller, and each of which retrieves images from the image device using the received image identifications.

13. A photofinishing laboratory according to claim 12 wherein each of the image processors retrieve images from the image device when the image processor is available to execute the corresponding image processing request.

14. A photofinishing laboratory, comprising:

(a) an image device which provides images as image signals;

(b) at least one image processor;

(c) at least one output device; and (d) a workflow controller which receives image identifications of the images and which:

communicates the image identifications of the images to the output device;

wherein the image processor, the image device, the workflow controller and the output device co-operate to provide processed images to the output device including:

the output device requesting processed images from the workflow controller using the image identifications;

the workflow controller communicating image processing requests associated with the images and associated image identifications to the image processor;

the image processor communicating the image identifications to the image device; and the image device, in response to the image identifications received from the image processor, communicating the images corresponding to the received image identifications to the image processor without using the workflow controller as an intermediary.

15. A photofinishing laboratory according to claim 14 wherein the image processor is configured to process each of the retrieved images in accordance with the corresponding image processing request.

16. A photofinishing laboratory according to claim 15 wherein the image processor is connected to communicate the processed images to the output device.

17. A photofinishing laboratory according to claim 16 wherein the output device is a printer.

18. A photofinishing laboratory for processing latent images on a film, comprising:

(a) a chemical developer to chemically develop the film to yield developed physical images from the latent images;

(b) a scanner to scan the developed physical images to obtain corresponding images as image signals;

(c) a memory which stores the images;

(d) at least one image processor; and (e) a workflow controller which receives image identifications of the images and which communicates image processing requests associated with the images and associated image identifications to the image processor;

wherein the image processor and the scanner co-operate to allow the image processor to retrieve images from the scanner including:

the image processor communicating the image identifications to the scanner; and the scanner, in response to the image identifications received from the image processor, communicating the images corresponding to the received image identifications to the image processor without using the workflow controller as an intermediary.

19. A photofinishing laboratory according to claim 18 additionally comprising a code reader to read a code associated with the film and generate a corresponding read code signal, and wherein the workflow controller communicates image processing requests to the image processor which are a function of the read code signal.

* * * * *